United States Patent Office 2,801,136
Patented July 30, 1957

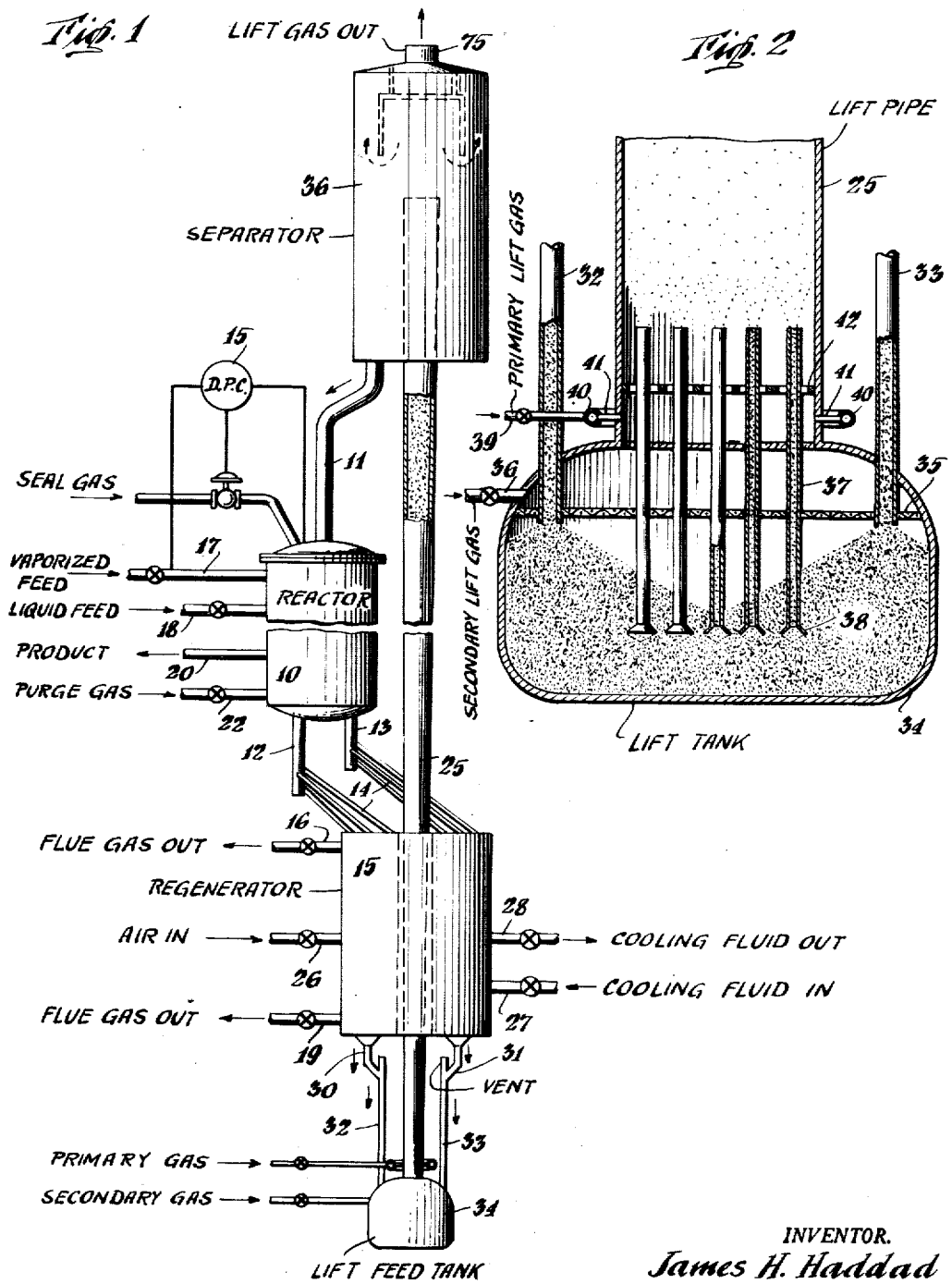

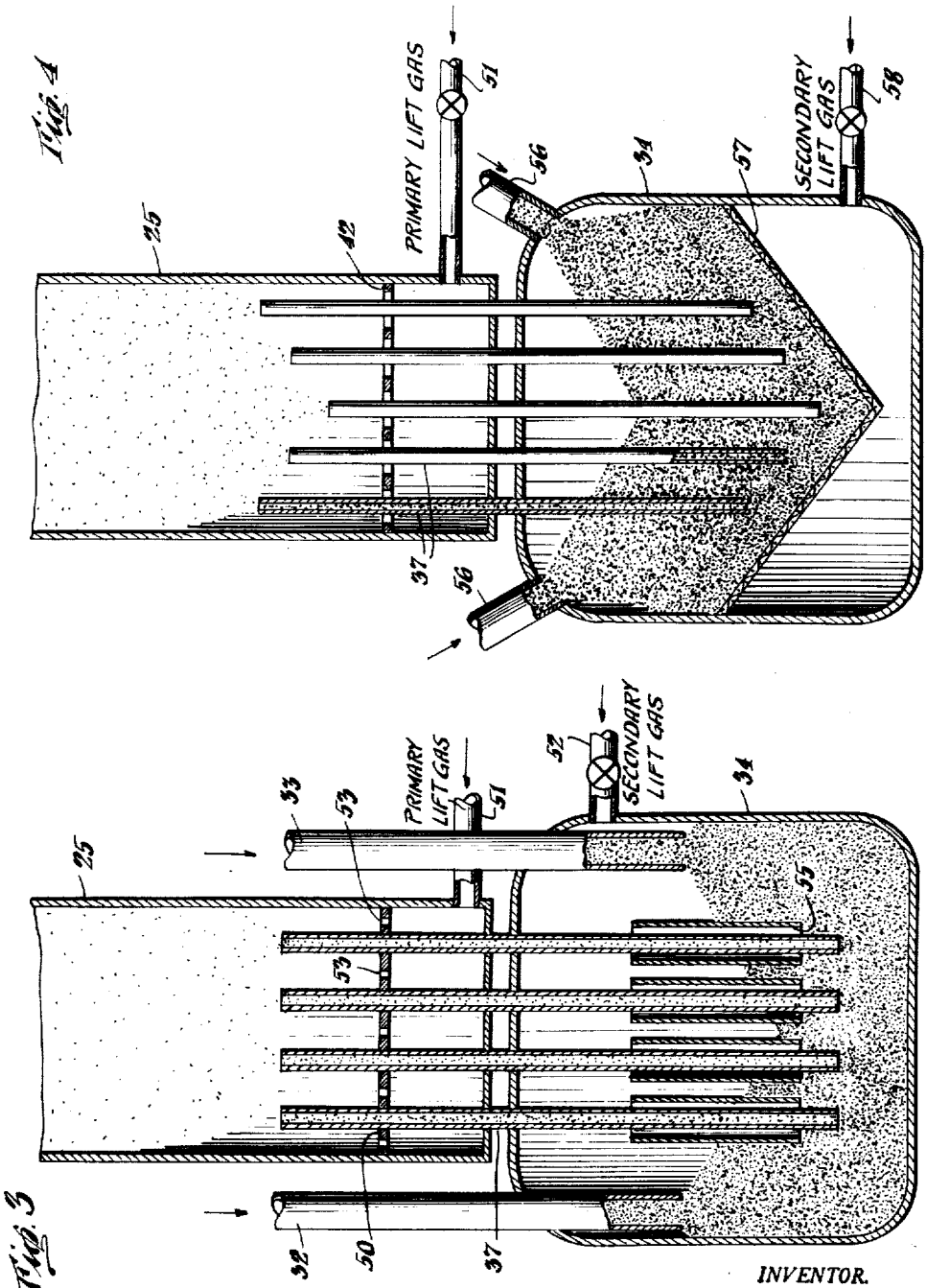

2,801,136

METHOD AND APPARATUS FOR FEEDING CONTACT MATERIAL INTO A GAS LIFT PIPE

James H. Haddad, Woodbury, N. J., assignor to Socony Mobile Oil Company, Inc., a corporation of New York Application November 12, 1952, Serial No. 320,005

4 Claims. (Cl. 302—53)

This invention pertains to the lifting of granular material through an upwardly directed lift pipe and is particularly directed to improved apparatus and a method of feeding the granular contact material into the lower end of a gas lift in continuous hydrocarbon conversion processes of the moving bed type which use gas lifts to raise the circulating contact material.

Various processes are now known for converting hydrocarbons in the presence of a gravitating bed of hot granular contact material to produce more desirable end products. The reactants are introduced into the gravitating bed and pass through the void spaces, the converted products being withdrawn from the other side of the bed. During conversion the particles receive a deposit of a carbonaceous material. The particles are removed from the bottom of the gravitating bed and transferred to a reconditioning zone where at least a substantial portion of the deposits are removed. The particles are usually gravitated as a compact bed downwardly through the reconditioning zone and air is passed through the bed to burn the carbonaceous material from the surface of the particles. The particles, after reconditioning, are returned to the top of the reaction bed for reuse. It is seen that the particles must be conveyed upwardly from the bottom of one gravitating bed to the top of the other bed to complete the enclosed cyclic path.

Processes which use continuously gravitating beds of solid contact material are catalytic cracking, hydrogenation, dehydrogenation, hydroforming, aromatization, and alkylation. In some processes such as coking and visbreaking the contact material may be inert particles of ceramic material used as a heat transfer medium primarily. The invention has application to these processes as well as to those processes in which particles have a catalytic action. The contact material may vary widely in its properties depending upon its use. For catalytic hydrocarbon conversion systems, for example, the catalyst may be a natural or treated clay, bauxite, inert or active carrier impregnated with certain catalytically active metals or compounds thereof, or may be a synthetic association of silica, alumina, magnesia, chromia, molybdenum oxide or combinations thereof. When the contact material is employed principally for heat carrying purposes, as in pyrolytic conversion processes, it may be made from refractory materials such as fused alumina, mullite, carborundum, zirconium oxide, charcoal, etc.; for coking processes the solid material may be a low activity clay catalyst, petroleum coke, pumice or similar material. The contact material may be in the form of pellets, spheres, tablets, pills or irregular-shaped material of appreciable size as compared to powdered material. The particles must be large enough so that the reaction vapors can be forced through the voids in the catalyst bed with reasonable pressure drops across the bed. The size range may be broadly from about 0.005 to 0.5 inch Tyler Standard Screen Analysis. The size range for catalytic cracking is preferably 4-20 mesh Tyler, whereas for other processes particles of other size may be found preferable. The density of the material as poured into a measuring container may be within the range about 20–130 pounds per cubic foot, and in the case of adsorbents preferably within the range about 25–60 pounds per cubic foot.

Various methods and apparatus have been used to lift the contact material in these moving bed processes. Bucket elevators have been used in the past primarily because they have the advantage of low catalyst attrition or particle breakage. Particle breakage is highly objectionable in these processes largely because the fine particles produced by the breakage and called "fines" tend to plug the voids in the contact beds. The fines make it necessary to use higher gas pressure differentials to force the gas through the beds. The fines are found to be objectionable in many other ways and are hence kept at a low percentage of the total inventory by continuous removal from the system. This, of course, makes it necessary to keep adding fresh catalyst to maintain a substantially constant catalyst inventory.

Recently gas lifts have been used to raise the catalyst in T. C. C. systems. The catalyst is mixed with a lift gas, usually air, in a lift tank at the bottom of an elongated substantially vertical lift pipe and transferred upwardly through the pipe in a rapidly-flowing stream of the lift gas. The catalyst particles are deposited on the surface of a bed of catalyst in a receiving vessel located about the top of the lift pipe and withdrawn separately from the gas. It is customary in these systems to pass the contact catalyst downwardly from the bottom of one of the contacting vessels into the top of the lift tank as a compacted column of solids and downwardly within the tank about the lower end of the lift pipe. The suspension of the particles takes place just beneath the lower end of the lift pipe where the particles are rapidly accelerated in an upward direction or generally upward direction. It has been customary to introduce a stream of gas upwardly into the lift pipe from a primary lift gas pipe terminated just beneath the bottom of the lift pipe or projected to some extent upwardly into a flared mouthpiece at the bottom of the pipe. A small portion of the lift gas has been introduced into the bed of contact material in the lift tank from laterally-spaced locations about the lower end of the lift pipe to travel inwardly through the mass of solids to drive particles into the lower end of the lift pipe through the annular space between the primary gas pipe and the flared mouthpiece.

Unless considerable caution is taken in the design and operation of the above-described gas lift, high catalyst attrition may occur in the lower portion of the lift pipe. It is also possible to have the inner wall of the lift pipe eroded by the catalyst. This appears to be caused by the fact that the particles are forced inwardly to converge in the high velocity stream of primary gas in the central region of the lift pipe. Particle collision occurs and particles are apparently driven outwardly against the inner wall of the lift pipe, at least at the lower portion of the pipe. The primary aim of the present invention is to introduce the catalyst into the lift gas stream without the occurrence of these undesirable results.

An object of this invention is to provide a method and apparatus for feeding granular contact material to a gas lift which overcomes the above-indicated objections.

A further object of the invention is to provide an improved method and apparatus for introducing a granular contact material into the lower end of an upwardly-directed gas lift.

A further object of the invention is to provide an improved method and apparatus for lifting granular contact material in a gaseous suspension through an upwardly-directed lift pipe with minimum attrition of the contact material and minimum erosion of the lift pipe.

These and other objects of the invention will be made more apparent in the subsequent detailed description of the invention.

One aspect of the invention involves the introduction of the primary gas into the lower end of a lift passage and the separate introduction of secondary lift gas and contact material into a multiplicity of upwardly-directed passages of substantially smaller cross-section than the lift passage. The small passages are uniformly distributed across the lift passage and are projected within the lift passage a substantial distance. The catalyst and primary gas are both oriented to a vertical direction of flow before coming together. The catalyst flow is straightened out in the multiplicity of passages of small cross-section while the velocity of the catalyst is low and the density of the catalyst is relatively high. The upward velocity of the catalyst particles rapidly increases after the particles are mixed with the upwardly-moving primary gas.

The details of the invention may be better understood by reference to a particular apparatus and process. A catalytic cracking apparatus is shown and described. Figure 1 is a unitary T. C. C. system which utilizes a gas lift to move the catalyst in the upward direction. Figure 2 is a showing of the lift tank and lower portion of the lift pipe of Figure 1, in vertical section. Figure 3 is similar to Figure 2, showing a modified form of apparatus. Figure 4 is also similar to Figure 2, showing a modified form of apparatus.

Referring now to Figure 1, a typical T. C. C. system is shown in which the reactor 10 is superposed the kiln 15 and a gas lift 25 is used to convey catalyst from the bottom of the kiln to the top of the reactor. The particles are gravitated as a substantially compact mass from the separator 36 through the seal leg 11 into the reactor 10. Vaporized feed is introduced into the reactor through the conduit 17 and liquid feed through the conduit 18. The product is withdrawn via the conduit 20. The reactor may be operated at an advanced pressure of approximately 5–30 p. s. i. gauge whereas the kiln may be operated at approximately atmospheric pressure. These pressures are usual in catalytic cracking of hydrocarbons but in other processes of conversion other pressures may be used. A seal gas is introduced into the top of the reactor and a purge gas is introduced into the bottom of the reactor via the conduit 22 to confine the reactants to the reaction zone. The purge gas also removes any heavy oil remaining on the catalyst. A differential pressure controller 15 may be used to limit the amount of seal gas introduced to that necessary to seal the vessel. During reaction the solid particles are contaminated with carbonaceous material formed as a result of the cracking reaction. The contaminated particles are removed from the vessel via the conduits 12, 13 and transferred to the top of the kiln 15 via the conduits 14. The kiln 15 is of annular cross-section and is located about the lift pipe 25. Air is introduced into the kiln 15 via the conduit 26 to burn the carbonaceous contaminant from the particulate material and the flue gas formed by the combustion is removed from the top and bottom of the kiln via the conduits 16, 19.

The regenerated catalyst is withdrawn from the bottom of the kiln via the conduits 30, 31 and passed downwardly through the straight pipes 32, 33 into the lift tank 34. The particulate material is seen to be in substantially compacted form as a continuous column from the separator down through the contacting vessels to the lift tank at the bottom of the lift pipe. A lift gas is mixed with the solids in the lift tank and the particles are driven upwardly through the lift pipe 25 to the separator 36. The stream of gas and flowing particles issue from the top of the pipe into a region of enlarged cross-section where the particles drop out of suspension onto a bed of the particles about the pipe. The gas is withdrawn from the vessel 36 via the pipe 75.

The invention may be understood more clearly by reference to Figure 2, which shows a view of the lift tank and lower lift pipe in section. The granular solids are withdrawn from the pipes 32, 33 into a region in the lower portion of the vessel 34 which is confined by a suitable screen 35. Secondary gas is introduced into the lift tank 34 via the conduit 36 at a level above the screen 35. The pressure of the secondary gas above the screen is slightly greater (0.25 p. s. i.) than the pressure of the gas after it has passed through the screen. This decreases the turbulence of the gas below the screen, and promotes a more uniform distribution of the gas to each of the feed pipes 37. A multiplicity of substantially vertical feed pipes 37 are uniformly located in the central portion of the tank 34 having their upper ends projected into the lower end of the lift pipe 25 a substantial distance. The pipes are of substantially smaller cross-section than the lift pipe and are equally distributed across the cross-sectional area of the lift pipe. The pipes 37 have flared inlets 38 at their lower ends to effect more uniform entrance of the solids into the pipes 37. A primary lift gas is admitted to the lower end of the lift pipe 25 through the pipes 39, 39, ring header 40, and lateral feeder pipes 41. A plate 42 is horizontally disposed across the lift pipe and possesses orifices through which the pipes 37 are projected. The orifices are made somewhat larger than the pipes 37 so that primary gas can pass through the same orifices about the exterior of the pipes 37. By properly sizing these annular spaces through which the primary gas passes to obtain a substantial gas pressure drop thereacross, the gas can be delivered uniformly across the pipe. The secondary gas passes through the bed of contact material in the lift tank effecting a loosening of the bed. The gas and solids pass upwardly through the pipes 37. The secondary gas flow is controlled to maintain the density of the solids in the pipes 37 fairly high. The particles enter the pipes 37 at a reasonably low velocity, so as to prevent particle damage during passage through the pipes 37. The particles are oriented to the vertically upward direction during passage through the pipes 37. The pipes are, therefore, made at least long enough to accomplish this purpose. The feed pipes should be of sufficient length so that the drop in pressure through the pipes is substantially greater than the drop in pressure from the top of the bed of solid material in the lift tank to the lower end of the center feed pipes.

The catalyst may flow up through the feed pipes as substantially compact streams but preferably the flow is in the form of a dense phase suspension. The primary gas and the solids are both moving in an upward direction prior to coming together. The primary gas velocity is generally high in comparison with the upward velocity of the particles in the feed pipes, and hence the particles are accelerated after they are discharged from the top of the feed pipes. The catalyst density in the lift pipe is materially reduced. For example, the catalyst density in the feed pipe may be broadly 0.5 to 130 pounds per cubic foot and preferably 2 to 60 pounds per cubic foot whereas the density in the lift pipe may be broadly 0.002 to 20 pounds per cubic foot and preferably 0.5 to 3.0 pounds per cubic foot.

If the gas superficial velocity in the upper end of the feed pipes is greater than that in the lift pipe at the same level, the gas would expand when discharged from the feed pipes causing the catalyst to bump into the walls of the lift pipe and to collide with other particles. For this reason, the superficial velocity of the gas in the upper end of the feed pipes is maintained at a value which is not greater than and preferably equal to or less than 10 percent in excess of the superficial gas velocity in the lift pipe. The superficial gas velocity at the bottom of the lift pipe should not be greater than the superficial gas velocity at the top end of the feeder pipes, however, by more than about twenty-five percent, and preferably not in excess of 10 percent. Above the level of the feed pipes, the gas velocity must be between maximum and minimum limits which depend upon the characteristics of the particles being lifted, the type of lift gas used, temperatures of gas and solids, and various other factors. The ranges found acceptable for gas lifts now used commercially are acceptable, being described in copending application for Letters Patent, Serial Number 210,942, filed February 14, 1951, now Patent No. 2,770,504, issued November 13, 1956.

The feed pipes are preferably of equal length and cross-section. They should be distributed across the interior of the lift pipe at equal distances from adjacent pipes. The minimum allowable distance of the nearest pipes to the interior wall of the lift pipe should be equal to the spacing between the pipes. The feed pipes should not cover more than 75 percent of the total lift cross-sectional area and preferably not more than 50 percent of that area. The cross-sectional area of the pipes will depend to some extent upon the type of material being handled; however, for granular material now used commercially in hydrocarbon conversion processes, the size of the feed pipes should not be less than 1 inch and preferably should be at least 2 inches or greater.

Figure 3 shows an alternate embodiment of this invention. In this aspect of the invention the plate 50 is horizontally located across the pipe 25 and the feed pipes 37 are fitted through tight-fitting holes in the plate. A multiplicity of orifices 53 are cut in the plate 50 between the feed pipes. The orifices provide for a suitable pressure drop in the primary gas so that the gas is uniformly distributed across the pipe 25. The primary gas may be introduced via the conduit 51 beneath the orifice plate 50. The catalyst is admitted to the lift tank 34 through the pipes 32, 33 to form a bed of solids in the lower portion of the vessel. The feed pipes 37 are terminated at their lower ends beneath the surface of this bed. A sleeve 55 is located after the bottom of each feed pipe, thereby providing an annular passage to the bottom of the feed pipe for transfer of secondary lift gas. The lower ends of sleeves 55 terminate at a level about the lower ends of pipes 37. Thus, the secondary gas travels through a thickness of catalyst bed and can engage catalyst. The lower ends of all sleeves 55 terminate on the same level so that the gas to each pipe 37 goes through the same thickness of catalyst. This assures uniform distribution of gas to each pipe 37.

Another embodiment of this invention is shown on Figure 4. A conical screen 57 is located in the lower portion of the vessel. The screen has sloping walls located at approximately the angle of repose of the contact material. The solid particles are introduced via the conduits 56, 56 about the exterior of the vessel and form on the screen a bed of particles of substantially the same depth across the vessel. Secondary gas is introduced into the vessel via the conduit 58 beneath the screen 57. The feed conduits 37 are arranged across the vessel at equal distances above the screen 57. The conduits are made of equal length so that those conduits located near the wall of the lift pipe 25 projected a further distance into the pipe than those conduits located near the center of the pipe.

This invention is not intended to be limited to any specific embodiment shown above being broad in its application and intended to cover all changes and modifications of the examples of the invention herein chosen for purposes of disclosure, which do not constitute departures from the spirit and scope of the invention.

I claim:

1. Apparatus for introducing lift gas and granular solids into an upwardly-extending lift pipe for transferring the solids therethrough in a stream of lift gas comprising in combination: a lift tank, downwardly-directed supply conduits projected into the upper portion of the tank, for feeding solids into the tank, a plurality of vertical feed pipes extending upwardly from an intermediate level of said lift tank into the lower end of said lift pipe and terminating at a plurality of points uniformly distributed across the horizontal cross-section of the lift pipe, a screen horizontally located across the interior of said lift tank at a level above the lower end of said feed pipes and the lower end of said supply conduits, a secondary gas inlet attached to said lift tank at an elevation above said screen, a primary gas inlet to the lift pipe located below the upper ends of said feed pipes, a horizontal plate located in said lift pipe below the upper ends of said feed pipes but above the level of said primary gas inlet, and means defining gas passageways through said plate distributed uniformly thereacross, so as to effect uniform distribution of the primary gas across the lift pipe.

2. Apparatus for introducing lift gas and granular solids into an upwardly-extending lift pipe for transferring the solids therethrough in a stream of lift gas comprising in combination: a lift tank, downwardly-directed supply conduits projected into the upper portion of the tank, for feeding solids into the tank, a plurality of vertical feed pipes extending upwardly from an intermediate level of said lift tank into the lower end of said lift pipe and terminating at a plurality of points uniformly distributed across the horizontal cross-section of the lift pipe, a screen horizontally located across the interior of said lift tank at a level above the lower end of said feed pipes and the lower end of said supply conduits, a secondary gas inlet attached to said lift tank at an elevation above said screen, a primary gas inlet to the lift pipe located below the upper ends of said feed pipes, a horizontal plate located in said lift pipe below the upper ends of said feed pipes but above the level of said primary gas inlet, and means defining orifices in said plate located about the feed pipes, whereby the primary gas stream is split into separate streams and the pressure of each stream is materially reduced, causing the primary gas to be more uniformly distributed across the cross-section of the lift pipe.

3. Apparatus for introducing lift gas and granular solids into an upwardly-extending lift pipe for tranferring the solids therethrough in a stream of lift gas comprising in combination: a lift tank, conduits attached to the upper periphery of said tank, for gravitating granular solids thereinto, a plurality of vertical feed pipes extending upwardly from an intermediate level of said lift tank into the lower end of said lift pipe and terminating at a plurality of points uniformly distributed across the horizontal cross-section of the lift pipe, the pipes being of substantially equal length, the ends of said pipes terminating in an imaginary right cone having its axis parallel to and coincident with the axis of the lift pipe and having an apex angle of about 120 degrees, whereby the lower ends of said feed pipes are projected downwardly into the bed of solids in said lift tank substantially equal distances, a screen across the interior of said lift tank, designed to prevent the granular solids from dropping to the bottom of the vessel, said screen being in the form of a right cone with its axis parallel to and coincident with the axis of the lift pipe and having an apex angle of about 120 degrees, conduit means attached near the bottom of said lift tank, for feeding secondary lift gas beneath the screen, a primary gas inlet to the lift pipe located below the upper ends of said feed pipes and baffle means in said lift pipe, located between the upper ends of said feed pipes and the primary gas inlet, designed to straighten out the direction of primary gas flow.

4. In a process for transferring granular solid particles from one level to a higher level through a vertically extending confined lift passage, the method for supplying the solids and gas to the lower section of the lift passage comprising: maintaining a bed of solid particles surrounding and below the lower ends of a plurality of confined substantially vertical feed passages that communicate with the lower section of the lift passage, introducing a secondary lift gas into and through the bed of solid particles to force solids into the bottom of and upwardly through the substantially vertical feed passages into the lower section of the lift passage, the length of said feed passages being at least sufficient to cause a drop in gas pressure thereacross which is greater than the drop in gas pressure from the point of secondary gas introduction to the bed of solids to the lower end of the most remote feed passage, discharging the solids upwardly from the feed passages into the lift passage at a plurality of points uniformly spaced apart and distributed over the horizontal cross-sectional area of the lift passage, supplying directly to the lower portion of the lift passage, the primary gas required for lifting the particles so that the primary gas is flowing upwardly in the lift passage at the level of discharge of the solid feed streams therein, maintaining the density of the solids in the feed passages higher than the density of solids in the lift but maintaining the velocity of solids in the feed passages substantially less than the velocity of the solids in the base of the lift passage, maintaining the density of the solids in the feed passages less than 60 pounds per cubic foot and the density of the solids in the lift passage less than 3 pounds per cubic foot, the superficial gas velocity at the bottom of the lift passage being less than 10% in excess of the superficial gas velocity at the upper end of the feed passages, the feed passages being of sufficient length so that the solids flow is straightened out at relatively low velocity and then the solids are rapidly accelerated in a vertical direction after contacting the primary lift gas whereby collisions between particles and between particles and the wall of the lift passage are minimized.

References Cited in the file of this patent

UNITED STATES PATENTS

| | | |
|---|---|---|
| 2,527,488 | Schemm | Oct. 24, 1950 |
| 2,561,409 | Ardern | July 24, 1951 |
| 2,625,442 | Kollgaard | Jan. 13, 1953 |
| 2,675,275 | Burtis | Apr. 13, 1954 |
| 2,715,048 | Kollgaard | Aug. 9, 1955 |
| 2,723,180 | Cellani | Nov. 8, 1955 |
| 2,726,121 | Delaplaine | Dec. 6, 1955 |
| 2,758,883 | Kollgaard | Aug. 14, 1956 |
| 2,758,884 | Weinrich | Aug. 14, 1956 |

UNITED STATES PATENT OFFICE

CERTIFICATE OF CORRECTION

Patent No. 2,801,136                                                  July 30, 1957

James H. Haddad

It is hereby certified that error appears in the above numbered patent requiring correction and that the said Letters Patent should read as corrected below.

In the grant, lines 2 and 12, and in the heading to the printed specification, lines 4 and 5, name of assignee, for "Socony Mobile Oil Company, Inc." read -- Socony Mobil Oil Company, Inc. --; column 5, line 39, for "after" read -- about --.

Signed and sealed this 24th day of September 1957.

(SEAL)
Attest:

KARL H. AXLINE
Attesting Officer

ROBERT C. WATSON
Commissioner of Patents